US008305841B2

(12) United States Patent
Riordan et al.

(10) Patent No.: US 8,305,841 B2
(45) Date of Patent: Nov. 6, 2012

(54) METHOD AND APPARATUS FOR DETERMINING THE TOPOGRAPHY OF A SEAFLOOR AND A VESSEL COMPRISING THE APPARATUS

(75) Inventors: James Riordan, Farranfore (IE); Daniel Toal, Monaleen (IE); Edward Thurman, Bantry (IE)

(73) Assignee: University of Limerick, Limerick (IE)

( * ) Notice: Subject to any disclaimer, the term of this patent is extended or adjusted under 35 U.S.C. 154(b) by 256 days.

(21) Appl. No.: 12/664,632

(22) PCT Filed: Jun. 16, 2008

(86) PCT No.: PCT/IE2008/000064
§ 371 (c)(1),
(2), (4) Date: Feb. 14, 2010

(87) PCT Pub. No.: WO2008/152618
PCT Pub. Date: Dec. 18, 2008

(65) Prior Publication Data
US 2010/0157736 A1    Jun. 24, 2010

(30) Foreign Application Priority Data

Jun. 15, 2007 (IE) .................................. S2007/0430

(51) Int. Cl.
*G01S 15/89* (2006.01)
(52) U.S. Cl. ......................................................... 367/88
(58) Field of Classification Search ...................... 367/88
See application file for complete search history.

(56) References Cited

U.S. PATENT DOCUMENTS
2010/0157736 A1 * 6/2010 Riordan et al. ................ 367/88

FOREIGN PATENT DOCUMENTS
WO    WO 2008152618 A1 * 12/2008

OTHER PUBLICATIONS

Christian De Moustier et al, "Simultaneous Operation of the Sea Beam Multibeam Echo-Sounder and the SeaMARC II Bathymetric Sidescan Sonar System", IEEE Journal of Oceanic Engineering, vol. 15, No. 2, Apr. 1, 1990, pp. 84-94, XP002495174.
Edward Thurman et al, "Automated Optimisation of Simultaneous Multibeam and Sidescan Sonar Seabed Mapping", Oceans 2007—Europe, IEEE, PI, Jun. 18, 2007, pp. 1-6, XP031134330.

(Continued)

*Primary Examiner* — Daniel Pihulic
(74) *Attorney, Agent, or Firm* — Sughrue Mion, PLLC (57) ABSTRACT

A method and apparatus for determining the topography of a seafloor includes providing a vessel with a multibeam sonar device which transmits first pulses of first signals, and a pair of sidescan sonar devices, which transmit second pulses of second signals, spaced apart rearwardly from the multibeam sonar device on the vessel. The first and second pulses produced by the multibeam sonar device and the sidescan sonar devices, respectively, are interleaved, and the time duration between each second pulse and the next following first pulse, and between each first pulse and the next following one of the first and second pulses is determined as a function of the maximum time-of-flight of the first signals of one of the previous first pulses from the time of transmission thereof to the time of reception of the backscattered first signals.

20 Claims, 4 Drawing Sheets

OTHER PUBLICATIONS

J. H. Parker et al, "Collection and processing of multibeam and side-scan data to hydrographic standards", Oceans '96. MTS/IEEE. Prospects for the 21st Century. Conference Proceedings Fort Lauderdale, FL, USA Sep. 23-26, 1996, New York, NY, IEEE, vol. 3, Sep. 23, 1996, pp. 1108-1113, XP010203703.

R. F. Dwyer, "Advances in sonar signal processing in the 90's", Oceans '96. MTS/IEE. Prospects for the 21st Century. Conference Proceedings Fort Lauderdale, FL, USA Sep. 23-26, 1996, New York, NY, USA, IEEE, vol. 1 Sep. 23, 1996, pp. 364-372, XP010203846.

Parrott et al., "Integration of Multibeam Bathymetry and Sidescan Sonar Data for Geological Surveys", Oceans '99 MTS/IEEE, Riding the Crest into the 21st Centrury, 1999, pp. 1129-1133.

Lurton et al., "The CALIMERO project: Scientific objectives and first at-sea results," SeaTechWeek, Oct. 2004, pp. 1-8, Brest 21-22.

* cited by examiner

METHOD AND APPARATUS FOR DETERMINING THE TOPOGRAPHY OF A SEAFLOOR AND A VESSEL COMPRISING THE APPARATUS

The present invention relates to a method and apparatus for determining the topography of a seafloor and the invention also relates to a vessel comprising the apparatus.

As the acquisition of additional mineral and energy supplies emerges at the forefront of international strategic thinking, policy makers have started looking towards the subsea environment as a rich reserve of natural resources. Representing one of the last major frontiers for discovery it is envisaged that exploration of the seafloor landscapes in both our deep-ocean, coastal and inshore waters will illuminate a plethora of potential economic opportunities. While the priority is to map the detail and composition of the subsea environment, the data collected will also serve to further scientific understanding such that potential areas for sustainable development of natural resources, be they fish, oil, gas, mineral, or pharmaceutical, can be identified.

Unlike terrestrial monitoring remote sensing applications, video and radar are rarely used to map the inshore, coastal, and deep ocean seafloors due to the high attenuation of high frequency electromagnetic waves underwater. Instead, underwater survey operations employ sonar sensors to provide information on the subsea environment by the way in which features of the seabed and surrounding water column transmit, reflect, and/or absorb acoustic waves.

Acoustic imaging of the underwater environment is used in a wide range of operational and research applications, for example, hydrographical surveying, ocean engineering, fisheries research, habitat classification, heritage and archaeology studies, and the like. While low frequency (<100 kHz) sonars have a long range imaging capability, the generated datasets are inherently low resolution due to the combined effects of the wide beam geometry characteristic of low frequency transducer designs and the long duration of the emitted acoustic pulse required to ensonify at long ranges. The resulting large area of the projected beam footprint on the seafloor precludes the discrimination of small-scale features. High frequency (>100 kHz) imaging sonar generate high-resolution datasets, however their operational range is limited to less than a few hundred meters due to the high attenuation of the acoustic pulse as it propagates through the water column. Consequently, if high-resolution sonar datasets are required, the deployed survey platform must maintain close proximity to the seafloor.

The use of high-frequency ship-mounted sonar to map shallow-water seafloors results in datasets that exhibit both high accuracy and high resolution. For data acquisition transect following, the ideal situation is straight-line motion with no variation in the speed or angular position of the sonar transducers. However, as surface vessels are typically affected by external influences such as wind and surface swell the physical dynamics of the marine environment consequently requires the use of a precise three axis measuring system to compensate for survey platform motion disturbance. Measured seafloor sample points are thus referenced to a high accuracy positioning system on board the surface ship, for example, Differential GPS (DGPS) coupled to a Motion Reference Unit (MRU).

With the application of high-frequency ship-mounted acoustic mapping systems only feasible in reasonably shallow water, Unmanned Underwater Vehicle (UUV) deployed survey solutions are employed for high resolution mapping in deep waters due to their ability to be operated close to the seafloor. Due to the rapid attenuation of GPS satellite signals underwater, UUV survey solutions use Inertial Navigation Systems (INS), with support from depth sensors, Doppler Velocity Logs (DVL) and acoustic Short and Long Baseline positioning systems through Kalman filter fusion, to compensate for the effects of sensor drift, subsea currents and surface vessel/tether motion coupling. Such an inertial navigation system using a Kalman filter with aiding sensors is the state of the art.

Depending on the sonar sensor employed, the data acquired during acoustic seafloor mapping operations yields two distinct types of datasets, namely, contoured bathymetry maps which are generated from multibeam sonar data, and acoustic reflectivity images which are generated from sidescan sonar data.

While curved array and dual head configuration are available, multibeam sonar systems typically consist of a projector and receiver array mounted perpendicular to each other in a T-shaped configuration, and with the projector mounted parallel to the fore-aft line of the survey platform. The projector emits an acoustic pulse, the spatio-temporal evolution of which traces the profile of a fan-shaped beam as it propagates through the water column, with the centre of the main-lobe directed vertically downwards, referenced to the sonar-fixed coordinate frame. The emitted beam typically encompasses a 120°-150° sector in the plane orthogonal to the survey platform heading (across-track) and a 1° to 3° sector along the fore-aft axis of the survey platform (along-track), and ensonifies a long thin strip of the seafloor orthogonal to the survey platform heading. The receiver array resolves the depth (range/angle) of sample points along the ensonified swath by using phase differencing techniques on the amplitude-time series of the acoustic pressure measured at each ceramic element in the receiver array to electronically steer 100 to 600 reception beams (0.5° to 1° across-track×20° to 30° along-track). Multibeam systems are capable of collecting vast amounts of highly accurate seafloor depth (bathymetry) information (through the intersection of the transmit and receive beam patterns) with vertical depth resolutions of 10 cm or less and can acquire over one million soundings per hour.

Sidescan sonar systems generate a two dimensional record of the acoustic energy backscattered by the region of the seafloor orthogonal to the survey track as a function of slant range (time) for each transmission-reception cycle. Two transducers are mounted on the survey platform, one on the port side and one on the starboard side. Each transducer has a fan-shaped beam directivity that is largely open in the vertical plane (40°-60°) and slightly inclined downward from the horizontal (5°-10°) in order to ensonify at far ranges while avoiding vertical (seabed at nadir) and sea surface ensonification. The fan angle of the beam is very narrow in the vertical plane in the fore/aft direction of the vessel, and is typically of the order of 0.5° to 1° to enable the best possible spatial resolution. The initial portion of the amplitude-time series corresponds to background noise and echoes from suspended targets such as thruster cavitation, fish, plant matter, and the like) as the pulse propagates through the water-column. The first return from when the pulse intercepts the seafloor is generally of high intensity due to the superposition of side-lobe returns and specular reflections. However, once the pulse propagates outward towards the oblique grazing incidence zones, the echo strength of the reflected signal is primarily modulated by the local sediment type and relief of the seafloor. The narrow pulse width and along-track shape of the beam pattern permits spatial delimiting of small-scale features within the ensonified region and by mosaicking several adjacent swathes an almost photo-realistic, two-dimensional picture of the seabed geological and sedimentary features is revealed.

With high precision technology to address survey platform positioning in existence and commercially available, multibeam and sidescan sonar datasets from the same seafloor region can be accurately fused to yield a more comprehensive representation of the seafloor geometry and sediment composition. Sidescan images enhance the geologic interpretation of bathymetry by providing an acoustic characterisation of the seafloor from which geologic composition can be inferred, while bathymetry information improves the representation of the seafloor relief in sidescan imagery by providing the geometric configuration of the seabed.

For example, in [R. Parrott, Clarke J. H., Fader G., Shaw J., and Kamerrer E., "*Integration of multibeam bathymetry and sidescan sonar data for geological surveys*", OCEANS '99 MTS/IEEE, Riding the Crest into the 21st Century, 1999.], multibeam bathymetric, sidescan sonar, and high-resolution sub-bottom profiler data were collected during a geophysical survey off Liverpool, Nova Scotia, Canada. As the initial step in the regional assessment of the marine geology the bathymetry data provided detail about the morphology and origin of the seafloor, while the sidescan sonar data provided a comparable display but with much greater resolution and detail.

However, the aforementioned paper documents that it was necessary to conduct separate surveys for the multibeam system data acquisition process on the one hand and sidescan sonar data acquisition process on the other hand. While the reception circuitries of multibeam and sidescan sonar transducers are frequency band-limited to prevent interference from simultaneously operating acoustic instruments of different frequencies, cross-sensor acoustic interference prevented the simultaneous operation of the similar frequency multibeam, 300 kHz, and the dual frequency sidescan sonar, 120 kHz and 330 kHz, systems. Although multibeam instruments can be depth gated in an attempt to filter returns from the sidescan emitted pulse, sidescan sonar records are severely distorted by the multibeam emitted pulse as they rely on the full temporal trace of the seafloor backscattered acoustic energy to construct an intensity image. Consequently, in the aforementioned survey the multibeam bathymetry data was first collected with the processed terrain model used to provide a priori information for the subsequent sidescan and sub-bottom profiler data collection survey.

Others have sought alternative methods to overcome the problem of cross-sensor acoustic interference by separating the operating frequency of payload sonars sufficiently far that they are undetectable to each other. For example, in [X. Luton, "*The CALIMERO project: Scientific objectives and first at-sea results*," SeaTechWeek 2004, In-situ Seabed Characterization, 2004], results from the SHOM and Werner co-operated CALIMERO project are documented. This project aimed at inter-calibrating current tools used in seafloor mapping surveys and developing new methodologies in multi-sensor data exploitation. Surveys were conducted in which multibeam and sidescan sonars were used concurrently but with both systems operating at distant frequencies. During the survey in the Gulf of Lions, the RV Beautemps-Neaupré was equipped with two multibeam (12 kHz and 95 kHz) echo-sounders and a high-resolution sidescan sonar 450 kHz. While the project was successful in simultaneously acquiring both multibeam bathymetric data and sidescan sonar images, it was only possible using distant frequency systems. Frequency separation degrades the quality of generated datasets, with the result that small-scale features may only be evident in a single dataset thereby compromising the data interpretation process.

Temporally separating the transmission/reception cycles of close proximity similar frequency sonars has been attempted in [C. de Moustier, Lonsdale P. F., and Shor A. N., "*Simultaneous operation of the Sea Beam multibeam echo-sounder and the SeaMARC II bathymetric sidescan sonar system,*" Oceanic Engineering, IEEE Journal of, vol. 15, pp. 84-94, 1990], which reports the simultaneous collection of multibeam and sidescan sonar data using co-frequency 12 kHz systems by interleaving their pings. The described algorithm takes into account the timing requirements of both systems and schedules the multibeam transmit cycles around the sidescan timing events using a sound synchronisation unit. The sidescan transmission rate is held constant and its trigger pulse used as a reference to ping the multibeam echosounder. However, this system does not take into account both the varying altitude of the survey platform and the varying geometry of the seafloor terrain and because of fixed transmission rates is best suited for long-range deep-water applications.

In summary, most commonly when separate sonar datasets (e.g. Multibeam and Sidescan) are required for a target area they are acquired in separate surveys it is relatively uncommon for separate data sets to be acquired simultaneously, thereby greatly increasing survey time and costs. Where applied, traditional multiple sonar triggering routines attempt to avoid cross sonar interference using either sonar triggering schedules of fixed timing or by employing different frequency sonars, thereby either greatly increasing survey time and costs or compromising the resolution of any low frequency acquired datasets. With the costs of underwater operations very high, and dominated principally by the expense of the survey vessel time, any improvement in the planning and execution of seabed mapping, improvement in the quality of the resulting data, and especially reduction in survey duration are of significant interest to the marine and offshore community. Accordingly, there exists, and has existed for some time, a very real need for a method and apparatus that would address at least some of the aforementioned problems.

The present invention is directed towards a method and apparatus for determining the topography of a seafloor which addresses at least some of the problems of known methods and apparatus, and the invention is also directed towards providing a vessel comprising apparatus for determining the topography of a seafloor which addresses at least some of the problems of known methods and apparatus.

According to the invention there is provided a method for determining the topography of a seafloor, the method comprising:

sequentially transmitting a plurality of respective first pulses of first signals of a predetermined first frequency towards respective first portions of the seafloor, sequentially receiving backscattered first signals resulting from backscattering of the first signals of the respective first pulses from the seafloor, sequentially transmitting a plurality of respective second pulses of second signals of a predetermined second frequency towards respective second portions of the seafloor, sequentially receiving backscattered second signals resulting from backscattering of the respective second signals of the second pulses from the seafloor, and storing data representative of the received backscattered first and second signals referenced to data representative of the locations of the corresponding first and second portions of the seafloor for facilitating preparation of an image of the topography of the seafloor, wherein
each second pulse is transmitted between two consecutive first pulses, and
the time duration between each second pulse and the next following first pulse is determined as a function of the time-of-flight of the first signals of a previous first pulse from the time of transmission thereof to the time of reception of the corresponding backscattered first signals.

In one embodiment of the invention the time duration between each second pulse and the next following first pulse is determined as a function of the maximum time-of-flight of the first signals of one of the previous first pulses from the time of transmission thereof to the time of reception of the back scattered first signals. Preferably, the time duration between each second pulse and the next following first pulse is determined as a function of the time-of-flight of the first signals of the immediately previous first pulse from the time of transmission thereof to the time of reception of the corresponding backscattered first signals. Advantageously, the time duration between each second pulse and the next following first pulse is determined as a function of the time-of-flight of the first signals of the previous first pulse from the time of transmission thereof to the time of reception of the corresponding backscattered first signals in real time.

In another embodiment of the invention the time duration between each first pulse and the next following one of the first and second pulses is determined as a function of the time-of-flight of the first signals of one of the previous first pulses from the time of transmission thereof to the time of reception of the backscattered first signals. Preferably, the time duration between each first pulse and the next following one of the first and second pulses is determined as a function of the maximum time-of-flight of the first signals of one of the previous first pulses from the time of transmission thereof to the time of reception of the backscattered first signals. Advantageously, the time duration between each first pulse and the next following one of the first and second pulses is determined as a function of the time-of-flight of the first signals of the immediately previous first pulse from the time of transmission thereof to the time of reception of the backscattered first signals. Ideally, the time duration between each first pulse and the next following one of the first and second pulses is determined as a function of the time-of-flight of the first signals of the previous first pulse from the time of transmission thereof to the time of reception of the backscattered first signals in real time.

In one embodiment of the invention the time duration between each second pulse and the next following first pulse is determined as a function of the resolution with which the image of the topography of the seafloor is to be prepared.

In another embodiment of the invention the time duration between each first pulse and the next following one of the first and second pulses is determined as a function of the resolution with which the image of the topography of the seafloor is to be prepared.

In a further embodiment of the invention one of the second portions of the seabed at which the corresponding one of the second pulses of the second signals is directed lies adjacent one of the first portions of the seabed at which a previous one of the first pulses of first signals is directed. Preferably, the one of the second portions of the seabed at which the corresponding one of the second pulses of the second signals is directed is adjacent the one of the first portions of the seabed at which the immediately previous one of the first pulses of first signals is directed.

In one embodiment of the invention the first and second pulses of the first and second signals are transmitted from a moving vessel.

In one embodiment of the invention the vessel is a surface vessel, and in an alternative embodiment of the invention the vessel is a submersible vessel, and in a still further embodiment of the invention the vessel comprises a combination of a surface vessel and a submersible vessel.

In a further embodiment of the invention the first pulses of the first signals are transmitted from a first location on the vessel forward of a second location relative to the direction of movement of the vessel from which the second pulses of the second signals are transmitted. Preferably, the first pulses of the first signals are directed downwardly to the respective first portions of the seafloor, the first portions of the seafloor being located beneath the vessel.

In another embodiment of the invention the second pulses of the second signals are transmitted from the vessel in a generally sidewardly outwardly and downwardly direction towards the respective second portions of the seafloor, the second portions of the seafloor being beneath and to one side of the vessel. Preferably, the second pulses of the second signals are transmitted from respective opposite sides of the vessel in a generally sidewardly outwardly and downwardly direction towards respective ones of the second portions of the seafloor on respective opposite sides of the vessel.

In one embodiment of the invention the geographical positions of the first and second portions of the seabed at which the first and second pulses of the first and second signals are directed are determined from the geographical positions of the vessel at the respective times at which the corresponding first and second pulses of the first and second signals are transmitted from the vessel. Preferably, the geographical positions of the vessel are determined by a three axis measuring system. Advantageously, the geographical positions of the vessel are determined by navigational sensors.

In one embodiment of the invention the geographical positions of the vessel are determined by a global positioning system.

In another embodiment of the invention the method further comprises determining the positions relative to the seafloor of the first and second locations from which the respective first and second pulses of the first and second signals are transmitted from the vessel.

Preferably, the positions relative to the seafloor of the first and second locations from which the first and second pulses of the first and second signals are transmitted from the vessel are determined by a three axis measurement system. Advantageously, the positions relative to the seafloor of the first and second locations from which the first and second pulses of the first and second signals are transmitted from the vessel are determined by navigational sensors.

In one embodiment of the invention the positions relative to the seafloor of the first and second locations from which the first and second pulses of the first and second signals are transmitted from the vessel are determined by a global positioning system.

Advantageously, the positions of the first and second locations from which the first and second pulses of the first and second signals are transmitted are determined from the respective positions of the vessel relative to the seabed.

In another embodiment of the invention the first pulses of the first signals are transmitted through a wide fan angle in a first transverse plane extending transversely of the direction of motion of the vessel. Preferably, the first transverse plane extends substantially vertically.

In another embodiment of the invention the fan angle of the first pulses of the first signals in the first transverse plane is of angular size in a range up to an angle of 180°. Preferably, the fan angle of the first pulses of the first signals in the first transverse plane lies in the range of 90° to 160°. Advantageously, the fan angle of the first pulses of the first signals in the first transverse plane is approximately 130°.

In another embodiment of the invention the fan angle of the first pulses of the first signal in the first transverse plane is centred around a first longitudinal plane extending vertically and in the direction of motion of the vessel. Preferably, the first longitudinal plane contains a longitudinally extending centre line of the vessel extending in the direction of motion of the vessel.

In one embodiment of the invention the first pulses of the first signals are transmitted through a narrow fan angle in the first longitudinal plane. Preferably, the fan angle at which the first pulses of the first signals are transmitted in the first longitudinal plane lies in a range up to 30°. Advantageously, the fan angle at which the first pulses of the first signals are transmitted in the first longitudinal plane lies in the range of 0.1° to 5°. Ideally, the fan angle at which the first pulses of the first signals are transmitted in the first longitudinal plane is approximately 0.75°.

Preferably, the fan angle at which the first pulses of the first signals are transmitted in the first longitudinal plane is substantially centred about the first transverse plane.

In one embodiment of the invention the second pulses of the second signals are transmitted through a wide fan angle in a second transverse plane extending transversely of the direction of motion of the vessel. Advantageously, the second transverse plane extends substantially vertically.

In another embodiment of the invention the fan angle of the second pulses of the second signals in the second transverse plane is of angular size in a range up to an angle of 90°. Preferably, the fan angle of the second pulses of the second signals in the second transverse plane lies in the range of 40° to 70°. Advantageously, the fan angle of the second pulses of the second signals in the second transverse plane is approximately 55°.

In another embodiment of the invention the fan angle of the second pulses of the second signals in the second transverse plane is centred around a second longitudinal plane extending in the direction of motion of the vessel and inclined to the vertical. Advantageously, the second longitudinal plane lies at an angle to the vertical in the range of 35° to 70°. Preferably, the second longitudinal plane lies at an angle to the vertical in the range of 40° to 60°. Ideally, the second longitudinal plane lies at an angle to the vertical of approximately 48°.

Preferably, the second pulses of the second signals are directed with the fan angle of the second pulse of the second signals centred about the second longitudinal plane such that reflection of the second signals from the surface of the water is minimised.

In one embodiment of the invention the second pulses of the second signals are transmitted through a narrow fan angle in the second longitudinal plane. Preferably, the fan angle at which the second pulses of the second signals are transmitted in the second longitudinal plane lies in the range of 0.1° to 30°. Advantageously, the fan angle at which the second pulses of the second signals are transmitted in the second longitudinal plane lies in the range of 0.5° to 2.5°. Ideally, the fan angle at which the second pulses of the second signals are transmitted in the second longitudinal plane is approximately 0.5°.

Preferably, the fan angle at which the second pulses of the second signals are transmitted in the second longitudinal plane are substantially centred about the second transverse plane.

In one embodiment of the invention the speed of the vessel is a function of the time-of-flight of the first signals of the first pulse of a previous one of the first pulses from the time of transmission thereof to the time of reception of the backscattered first signals. Advantageously, the speed of the vessel is responsive to the maximum time-of-flight of the first signals of at least one previous first pulse from the time of transmission thereof to the time of reception of the backscattered signals. Preferably, the speed of the vessel is responsive to the average time-of-flight of the first signals of at least two previous first pulses from the time of transmission thereof to the time of reception of the backscattered signals.

In one embodiment of the invention the first and second signals of the first and second pulses are sonic signals.

In another embodiment of the invention the first signals of the first pulses are of frequency lying in the range of 1 kHz to 1 MHz. Preferably, the first signals of the first pulses are of frequency lying in the range of 100 kHz to 900 kHz. Advantageously, the first signals of the first pulses are of frequency of approximately 500 kHz.

In another embodiment of the invention the second signals of the second pulses are of frequency lying in the range of 1 kHz to 1 MHz. Preferably, the second signals of the second pulses are of frequency lying in the range of 100 kHz to 900 kHz. Advantageously, the second signals of the second pulses are of frequency of approximately 500 kHz.

In one embodiment of the invention the frequency of the first and second pulses is substantially similar, and preferably, the frequency of the first and second pulses is identical.

In one embodiment of the invention the first and second pulses of the first and second signals are sequentially transmitted.

In another embodiment of the invention the first and second pulses of the first and second signals are alternately transmitted.

In another embodiment of the invention the first pulses of the first signals are generated by a multi-beam sonar device.

In a further embodiment of the invention the second pulses of the second signals are transmitted by a side scan sonar device.

Preferably, the data representative of the backscattered first signals is georeferenced.

The invention also provides apparatus for determining the topography of a seafloor, the apparatus comprising:
  a first transmitting means for sequentially transmitting a plurality of respective first pulses of first signals of a predetermined first frequency towards respective first to portions of the seafloor,
  a first receiving means for sequentially receiving backscattered first signals resulting from backscattering of the first signals of the respective first pulses from the seafloor,
  a second transmitting means for sequentially transmitting a plurality of respective second pulses of second signals of a predetermined second frequency towards the respective second portions of the seafloor,
  a second receiving means for sequentially receiving backscattered second signals resulting from backscattering of the respective second signals of the second pulses from the seafloor, and
  a storing means for storing data representative of the received backscattered first and second signals referenced to data representative of the locations of the corresponding first and second portions of the seafloor for facilitating preparation of an image of the topography of the seafloor, wherein the first transmitting means and the second transmitting means are operated so that each second pulse is transmitted between two consecutive first pulses, and the first and second transmitting means are operated so that the time duration between each second pulse and the next following first pulse is determined as a function of the time-of-flight of the first signals of a previous first pulse from the time of transmission thereof to the time of reception of the backscattered first signals by the first receiving means.

In one embodiment of the invention the first and second transmitting means and the first and second receiving means are located on a vessel adapted for moving in the water.

Preferably, the first transmitting means and the first receiving means are provided at a location on the vessel forward of a location on the vessel at which the second transmitting means and the second receiving means are provided.

Advantageously, the first transmitting means is located on the vessel for directing the first pulses of the first signals downwardly to the first portions of the seabed which are located beneath the vessel.

Ideally, the second transmitting means is located on the vessel for directing the second pulses of the second signals from the vessel in a generally sidewardly outwardly downwardly direction towards the second portions lying beneath and to one side of the vessel.

Preferably, two of the second transmitting and receiving means are located on respective opposite sides of the vessel.

In one embodiment of the invention a position determining means is provided for determining the positions of the respective first and second transmitting and receiving means relative to the seabed. Preferably, the position determining means comprises a three axis measurement device. Advantageously, the position determining means comprises the navigational sensor.

In another embodiment of the invention the position determining means comprises a global positioning system.

Advantageously, the position determining means is adapted for georeferencing the stored data in the storing means.

Preferably, the storing means is located on the vessel.

In one embodiment of the invention the first and second transmitting means are sonic transmitting means.

In another embodiment of the invention the first and second transmitting means are adapted to transmit the first and second signals of the first and second pulses at substantially similar frequencies.

In a further embodiment of the invention the first and second transmitting means are operated for sequentially transmitting the first and second pulses of the first and second signals.

In a still further embodiment of the invention the first and second transmitting means are operated for alternately transmitting the first and pulses of the first and second signals.

In one embodiment of the invention the first transmitting means comprises a multi-beam sonar device which includes the first receiving means.

In another embodiment of the invention the second transmitting means comprises a side scan sonar device which includes the second receiving means.

Preferably, the first receiving means is located adjacent the first transmitting means and the second receiving means is located adjacent the second transmitting means.

The invention also provides a vessel comprising the apparatus according to the invention.

Further the invention provides a vessel comprising apparatus for determining the topography of a seafloor, the apparatus comprising:

a first transmitting means located on the vessel for sequentially transmitting a plurality of respective first pulses of first signals of a predetermined first frequency towards respective first portions of the seafloor, a first receiving means located on the vessel for sequentially receiving backscattered first signals resulting from backscattering of the first signals of the respective first pulses from the seafloor, a second transmitting means located on the vessel for sequentially transmitting a plurality of respective second pulses of second signals of a predetermined second frequency towards the respective second portions of the seafloor, a second receiving means located on the vessel for sequentially receiving backscattered second signals resulting from backscattering of the respective second signals of the second pulses from the seafloor, and a storing means located on the vessel for storing data representative of the received backscattered first and second signals referenced to data representative of the locations of the corresponding first and second portions of the seafloor for facilitating preparation of an image of the topography of the seafloor, wherein the first transmitting means and the second transmitting means are operated so that each second pulse is transmitted between two consecutive first pulses, and the first and second transmitting means are operated so that the time duration between each second pulse and the next following first pulse is determined as a function of the time-of-flight of the first signals of a previous first pulse from the time of transmission thereof to the time of reception of the backscattered first signals by the first receiving means.

The advantages of the invention are many. In particular, the method and apparatus according to the invention optimises the time durations between the transmission of consecutive first and second pulses of the first and second signals, and thereby maximises the numbers of first and second pulses per unit time. In particular, the time duration between the transmission of each second pulse of second signals and the immediately following next first pulse of the first signals is optimised. This results from the fact that the time duration between the transmission of each second pulse and the immediately following next first pulse is determined as a function of the time-of-flight, and preferably the maximum time-of-flight of the first signals of a previous first pulse, and by determining the time duration between the transmission of each second pulse and the immediately following next first pulse as a function of the maximum time-of-flight of the first signals of the immediately previous first pulse, the time duration between the transmission of each second pulse and the immediately following first pulse is optimised.

A further advantage of the invention is that the time duration between the transmission of the first signals of each first pulse and the transmission of the first or second signals of an immediately following one of the first and second pulses is otpimised when the time duration between the transmission of each first pulse and the immediately following one of the first and second pulses is determined as a function of the time-of-flight and preferably the maximum time-of-flight of the first signals of a previous one of the first pulses, and in particular, when the time duration between the transmission of each first pulse and the next immediately following one of the first and second pulses is determined as a function of the maximum time-of-flight of the first signals of the immediately previous first pulse. Thus, by optimising the time durations between the transmission of consecutive pulses, be they first pulses followed by second pulses or first pulses followed by first pulses, or second pulses followed by first pulses, the amount of transmissions of first and second pulses per unit time is maximised, and therefore, either the resolution of the image of the topography of the seafloor subsequently prepared can be optimised and/or the speed of the vessel to provide the desired resolution of the image of the topography of the seafloor can also be optimised. This, thus, facilitates optimisation of mapping of the seafloor.

Additionally, by virtue of the fact that the time duration between consecutive ones of the first and second pulses is determined as a function of the time-of-flight and preferably the maximum time-of-flight of the first signals of a previous first pulse, the transmission of the first and second pulses is arranged so that interference between transmissions of consecutive ones of the first and second pulses is eliminated, and therefore, the frequencies of the first and second signals of the first and second pulses can be selected independently of each other, and may therefore be of the same or different frequencies. This provides a further advantage in that the frequency of the first and second signals of the first and second pulses can be selected to be of the optimum frequencies.

A further advantage of the invention is achieved when the time durations between consecutive ones of the first and second pulses, and the second and first pulses, is determined as a function of data indicative of the topography of one of the first portions of the sea floor derived from a previous transect or transects of the vessel and which is adjacent the first portion of the sea floor at which the previous or immediately previous first pulse has been directed. By also determining the respective time durations as a function of previously derived data as well as the time-of-flight or the maximum time-of-flight of the first signals of the previous or immediately previous first pulse the respective time durations are further optimised.

By determining the time durations from the time-of-flight or the maximum time-of-flight of the first signals of the previous or immediately previous first pulse in real time on the fly, the respective determined time durations are further optimised.

The invention will be more clearly understood from the following description of a preferred embodiment thereof which is given by way of example only with reference to the accompanying drawing, in which.

Referring to the drawing there is illustrated apparatus according to the invention indicated generally by the reference numeral 1 for determining the topography of a seafloor 3, and for producing data from which an image of the topography of the seafloor can be prepared. The apparatus 1 is suitable for mounting on a vessel 2, for example, a ship or a submersible vessel, and when the apparatus 1 is mounted on the vessel 2, the vessel is a vessel according to the invention. The apparatus 1 comprises six components which are mounted on the vessel 1.

The components of the apparatus 1 are as follows. A first transmitting means for sequentially transmitting first pulses of first signals of a predetermined first frequency, which is provided by a multibeam sonar device 5 mounted towards the forward end of the vessel 2 and which transmits the first pulses of the first signals downwardly towards the seafloor 3. In this embodiment of the invention the multibeam sonar device 5 produces the first signals as a series of individual signal beams spaced apart along an angular sector encompassed by an ensonified swath. The multibeam sonar device 5 may produce from 100 to 500 individual signal beams, depending on the resolution required. In this embodiment of the invention the multibeam sonar device 5 is set to produce the first signals at a frequency of 500 kHz. The multibeam sonar device 5 is mounted on the vessel 1 for directing the first pulses of the first signals substantially vertically downwardly at a first portion of the seafloor 3 which is directly beneath the vessel 2 with a wide fan angle $\beta$ of approximately 130° in a first vertical transverse plane 7 which extends transversely of the direction of motion A of the vessel 2, in other words, across-track. The multibeam sonar device 5 is located on the vessel 2 so that the fan angle $\beta$ is centred about a first vertical longitudinal plane 8 extending along and containing a longitudinal centre line 9 of the vessel 2 in the direction of forward movement thereof. The first pulses of the first signals are transmitted with a narrow fan angle $\theta$ of approximately 0.75° in the first longitudinal plane 8, in other words, along-track. The multibeam sonar device 5 includes a plurality of directional transducers (not shown) for receiving backscattered first signals which are backscattered by the seafloor. The transducers (not shown) are capable of identifying the amplitude of the received backscattered first signals and the directions from which the backscattered first signals are reflected from the seafloor 3 for use in subsequently determining respective profiles of the corresponding first portions of the seafloor at which the first pulses are directed, as will be described in more detail below.

A pair of second transmitting means for sequentially transmitting second pulses of second signals sidewardly outwardly of the vessel 2 and downwardly towards second portions of the seafloor 3 on respective opposite sides of the vessel 2 comprises two sidescan sonar devices 10 located on respective opposite sides of the vessel 2 and spaced apart rearwardly of the multibeam sonar device 5. The sidescan sonar devices 10 are operated to simultaneously produce the second pulses of second signals of frequency of the order of 500 kHz, and are arranged on the vessel 2 for directing the second pulses at the seafloor 3 in a common second vertical transverse plane 11 extending transversely of the direction of motion of the vessel 2. The sidescan sonar devices 10 are located on the vessel 2 at the respective opposite sides thereof for directing the second pulses of the second signals with a wide fan angle $\gamma$ of approximately 55° in the second transverse plane 11, substantially centred about respective second longitudinal planes 12 which extend at an angle $\alpha$ of approximately 47.5° to the vertical and along the direction of forward movement of the vessel 2. The sidescan sonar devices 10 are set so that when the fan angles $\gamma$ are centred around the corresponding second longitudinal planes 12, the fan angles $\gamma$ are depressed downwardly from the horizontal at an angle $\Phi$ typically of approximately 15° in order to avoid backscattering of the second signals of the second pulses from the surface of the water. However, the fan angle $\gamma$ may be depressed downwardly from the horizontal an angle $\Phi$ in the range of 5° to 20°, depending on sea conditions. The sidescan sonar devices transmit the second pulses of the second signals with a narrow fan angle Ω in the respective second longitudinal planes 12 of approximately 0.5°. The fan angles Ω of the second pulses are centred about the second transverse plane 11. Transducers (not shown) in the sidescan sonar devices 10 receive backscattered second signals backscattered from the seafloor 3, which are used in the preparation of the image of the topography of the seafloor 3, for indicating the composition of the seafloor 3, for example, rock, sediment and the type of sediment.

Such multibeam sonar devices and sidescan sonar devices and their individual uses will be well known to those skilled in the art, and further description should not be required.

Figure 1:
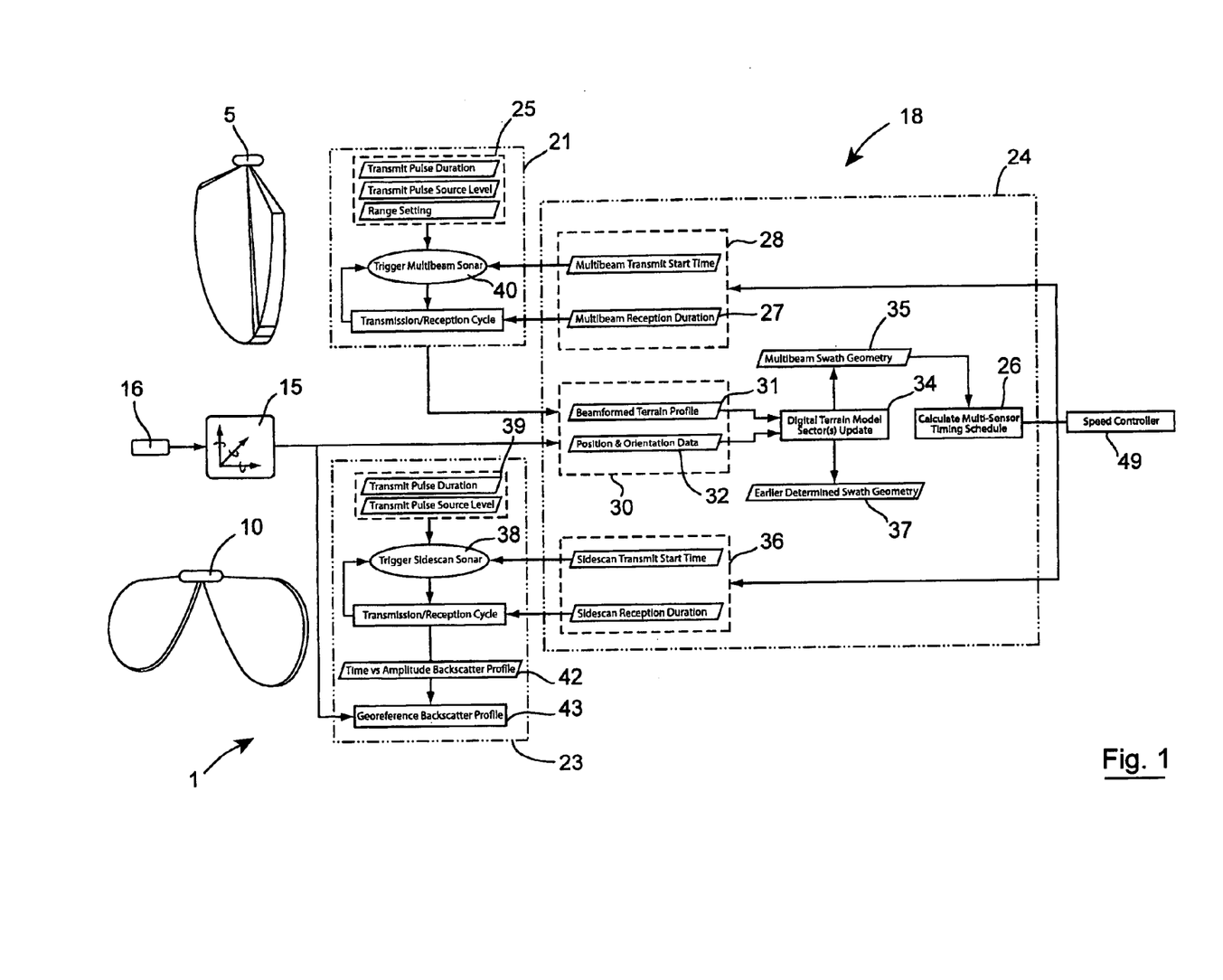
FIG. 1 illustrates apparatus according to the invention in block representation for determining the topography of a seafloor, and also illustrates operational function blocks thereof.

A position determining means for determining the current geographical position of the vessel 2 is provided by a three axes measuring device, such as, a gyroscope 15, and a differential global positioning communication device 16, both of which are located on the vessel 2 for determining the current georeferenced position of the vessel 2. However, in cases where the vessel 2 is a submersible vessel, and is operating underwater where a global positioning system cannot be used, the position determining means would be provided by a gyroscope/accelerometer based inertial navigation system with support from auxiliary sensors, for example, Doppler Velocity Logs, for positional and orientation information.

A computing means, in this embodiment of the invention a computer 18 which may be a personal computer or a mainframe computer is located on the vessel 2 and receives signals from the gyroscope 15 and the differential global positioning system communication device 16 or other such devices for determining the current location of the vessel 2, and also receives signals from the transducers of the multibeam sonar device 5 and the transducers of the sidescan sonar devices 10 for determining the topography of the seafloor as will be described below. The computer 18 is configured by software to include a multibeam sonar data acquisition element 21 for controlling the operation of the multibeam sonar device 2 and for receiving data indicative of the backscattered first signals received by the transducers of the multibeam sonar data acquisition element 21. The computer 18 is also configured to include a sidescan sonar data acquisition element 23 for controlling the operation of the two sidescan sonar devices 10 and for receiving data indicative of the backscattered second signals received by the transducers of the sidescan sonar devices 10. The computer 18 is also configured to include a processing and synchronisation element 24 for synchronising the operation of the multibeam sonar device 5 and the sidescan sonar devices 10, as well as the gyroscope 15 and the differential global position sensing communications device 16 and other such devices, and also for processing data acquired from the multibeam sonar device 5, the gyroscopes 15 and the differential global positioning system 16, and for in turn producing data from which an image of the topography of the seafloor can be produced. The processing and synchronisation element 24 may also process data acquired from the sidescan sonar devices 10.

Before describing the functional blocks of the elements 21, 23 and 24 of the computer 18, the operation of the apparatus 1 will first be described.

The vessel 2 with the apparatus 1 mounted thereon is operated to traverse the sea over the seafloor 3 in adjacent parallel paths, and as the vessel proceeds along the respective parallel paths, the multibeam sonar device 5 and the sidescan sonar devices 10 are operated alternately and sequentially for alternately and sequentially transmitting respective first and second pulses of the first and second signals, respectively. The first and second pulses from the multibeam sonar device 5 and the sidescan sonar devices 10 are alternately transmitted, and are directed towards respective portions of the seafloor. Since the frequency of the first and second signals is identical, the operation of the multibeam sonar device 5 and the sidescan sonar devices 10 are operated at different times for transmitting the first and second pulses of first and second signals, respectively, and for receiving the backscattered first and second signals from the seafloor 3, so that the first pulses of the first signals transmitted by the multibeam sonar device 5 do not interfere with reception by the sidescan sonar devices 10 of the backscattered second signals resulting from the second pulses of second signals, and vice versa. In other words, each second pulse of second signals is not transmitted until the backscattered first signals of the immediately previous first pulse have been received by the multibeam sonar device 5 to the extent that the second signals of the second pulse do not interfere with reception of the backscattered first signals by the multibeam sonar device 5, and vice versa.

Additionally, the processing and synchronising element 24 of the computer 18 is operated for determining profiles of the first portions of the seafloor 3 from the backscattered first signals received from the transducers of the multibeam sonar device 5 in response to each of the first pulses of the first signals. The data from the transducers of the multibeam sonar device 5 is processed in real time on the fly, in other words, simultaneously as it is being received by the transducers of the multibeam sonar device 5.

Additionally, while producing the profiles of the respective first portions of the seafloor 3 the processing and synchronisation element 24 of the computer 18 also determines the maximum time-of-flight of the first signals of the respective first pulses from the time of transmission of the first pulses to the time of reception of the backscattered first signals from each first pulse.

The time duration which is to be allowed between activation of the sidescan sonar devices 10 to produce the next second pulse and activation of the multibeam sonar device 5 to produce the next following first pulse is determined by the processing and synchronization element 24 as a function of the maximum time-of-flight of the first signals of the immediately previous first pulse. Additionally, the time duration which is to be allowed between activation of the multibeam sonar device 5 to produce the next first pulse and activation of the sidescan sonar devices 10 to produce the second pulse following the next first pulse is also determined as a function of the maximum time-of-flight of the first signals of the immediately previous first pulse.

However, in cases where the multibeam sonar device 5 and the sidescan sonar devices 10 are not alternately operated to alternately produce first and second pulses, the time duration to be allowed between activation of the multibeam sonar device 5 to produce the next first pulse and activation of the one of the multibeam sonar device 5 and the sidescan sonar devices 10 to produce the next one of the first and second pulses following the next first pulse is also determined as a function of the maximum time-of-flight of the first signals of the immediately previous first pulse.

The respective time durations between activation of the multibeam sonar device 5 and the sidescan sonar devices 10 are determined as a function of the maximum time-of-flight of the first signals of each first pulse in real time on-the-fly.

As the vessel 2 traverses along the respective adjacent parallel paths or transects over the seafloor, after the first path has been traversed the processing and synchronisation element 24 of the computer 18 utilises seafloor profile data computed from the back scattered first signals received from the transducers of the multibeam sonar device 5 during the previous pass or passes in conjunction with the maximum time-of-flight of the first signals of the immediately previous first pulse for determining the time durations between activations of the multibeam sonar device 5 and the sidescan sonar devices 10 as a function of signals which are indicative of the topography of one or more of the first portions of the sea floor for which data has already been collected from one or more respective paths over the sea floor which are adjacent the first portion of the sea floor at which the first pulse has been directed. It will be appreciated that data acquired which is indicative of the topography of the sea floor during earlier traversed paths thereof will only produce data relative to one side of the vessel 2. However, where the earlier data indicative of the adjacent portions of the sea floor indicate a level sea floor, the respective time durations between activations of the multibeam sonar device 5 and the sidescan sonar devices 10 are determined as a function of the previously acquired data indicative of the topography of the adjacent sea floor, assuming the sea floor to be level. If the previously acquired data indicative of the topography of the adjacent sea floor indicates sloping of the sea floor, the time durations between activations of the multibeam sonar device 5 and the sidescan sonar devices 10 is determined as a function of the previously acquired data indicative of the adjacent portion of the sea floor assuming sloping thereof.

In this way, overlap between the operation of the multibeam sonar device 5 in transmitting and receiving the first pulses of the first signals, and the operation of the sidescan sonar devices 10 in transmitting and receiving the second pulses of the second signals is avoided. By determining the time durations between transmissions of the first and second pulses, the time durations are optimised, and thus, the volume of data indicative of the topography of the seafloor which can be obtained is maximised.

Depending on the processing capacity of the computer 18, processing a continuous train of successive first pulses of first signals may not be possible. However, lower capacity computers may be accommodated due to the relatively slow forward speed of the vessel, which typically, would not be more than 2 to 4 knots. Since the sea floor topography does not change significantly between consecutive first and second pulses, in general, there is a relatively high coherence between the maximum time-of-flight of consecutive ones of the first pulses produced by the multibeam sonar device 5. Accordingly, the processing and synchronising element 24 can operate with a lower frequency update rate than the frequency rate at which the multibeam sonar device 5 is operated to produce the first pulses, due to a relatively high degree of redundancy exhibited between consecutive first pulses. Thus, in cases where it is not possible to process the data resulting from each first pulse, the most recently available data resulting from a previous first pulse produced by the multibeam sonar device 5 in general, should be sufficient. Thus, the time durations between the activations of the multibeam sonar device 5 and the sidescan sonar devices 10 is determined by the capability of the available computational resources of the computer 18 to execute without backlog in order to maintain real time operation.

Additionally, in this embodiment of the invention the speed of the vessel is also responsive to the maximum time-of-flight of the first signals of previous first pulses or the average of the maximum time-of-flight of the first signals of a predetermined number of first pulses, so that where the time-of-flight is detected as reducing as a result of the height of the vessel above the seafloor 3 reducing, the speed of the vessel may be increased, and vice versa. In the case of a submersible vessel operating under water, where the level above the sea floor at which the submersible vessel is operating can be varied, the depth at which the submersible vessel is operating is raised or lowered instead of altering the forward speed. Additionally, the heading of the vessel is also varied in order to maintain the along track resolution and the overlap between data from the earlier adjacent transect. Indeed, in the case of surface vessels, as well as altering the speed in response to the maximum time-of-flight of the first signals of the previous pulse or pulses, the heading of the vessel may also be altered in order to accommodate a desired overlap with the earlier adjacent transect.

Referring now in particular to FIG. 1 registers 25 in the multibeam sonar data acquisition element 21 which are programmable contain the pulse duration of each first pulse which in this case is approximately 100 microseconds, and the source level of the first signals of each first pulse. These values are manually programmed into registers 25. The range setting of the first pulses which are to be transmitted by the multibeam sonar device 5 is manually programmed into the registers 25 also. The duration during which the transducers of the multibeam sonar device 5 are operated to receive backscattered first signals is manually programmed into a register 27 in block 28 of the processing and synchronisation element 24. After the first of the first pulses has been transmitted by the first multibeam sonar device 5, the multibeam sonar device 5 is subsequently activated in response to signals from a timer (not shown) in block 26, as will be described in more detail below.

The backscattered first signals which are backscattered from the seafloor 3 are received by the transducers of the multibeam sonar device 5 and are read by block 30 of the processing and synchronisation element 24, and stored in a register 31. The position data from the gyroscope 15 and the differential global positioning device 16 are simultaneously read into a register 32 in block 30. As the backscattered first signals and the position data are simultaneously read into the registers 31 and 32 of block 30, they are simultaneously sequentially read out by block 34 which on the fly in real time produces data indicative of a profile of the portion of the seafloor 3, which is georeferenced to correspond with the relevant first portions of the seafloor 3 from which the backscattered first signals have been received. The georeferenced data indicative of the profile of the relevant first portions of the seafloor 3 is stored in registers 35. The georeferenced data indicative of each profile is also written to registers 37 where the georeferenced profile data computed from the respective first pulses is cumulatively stored for use in subsequent preparation of an image of the topography of the seafloor.

Block 26 determines the maximum time-of-flight of the first signals of the current first pulse, and checks the registers 37 to ascertain if an adjacent seafloor profile has been prepared of an adjacent portion in an adjacent previously traveled path. Block 26 determines the time duration to be allowed between the next second pulse and the first pulse immediately following the next second pulse, and the time duration to be allowed between the next first pulse and the second pulse immediately following the next first pulse based on the computed maximum time-of-flight of the first signals of the immediately previous first pulse or the most recent first pulse for which the maximum time-of-flight data is available as discussed above. Additionally, if a profile of an adjacent portion of the seafloor 3 is stored in block 37, block 26 determines the time duration to be allowed between the next second pulse and the immediately following next first pulse as well as the time duration to be allowed between the next following first pulse and the second pulse immediately following the next first pulse based on the maximum time-of-flight of the first signals of the immediately previous first pulse or the most recent first pulse for which the maximum time-of-flight data is available, as well as based on the stored profile in block 37. Otherwise the time duration between the next second pulse and the immediately following next first pulse and the time duration between the next first pulse and second pulse immediately following the next first pulse is determined based on the computed maximum time-of-flight of the immediately previous first pulse.

The timer (not shown) in block 26 in the processing and synchronisation element 24 of the computer 18 at the appropriate times based on the determined time durations outputs activation signals to the sidescan sonar data acquisition element 23, via block 36 for triggering the sidescan sonar devices 10 to transmit the next second pulse of second signals, and to the multibeam sonar data acquisition element 21 via block 28 for triggering the multiscan sonar device 5 to transmit the next first pulse of first signals. Block 38 in the sidescan data acquisition element 23 is responsive to the appropriate activation signals from the timer in block 26 to operate the two sidescan sonar devices 10 to simultaneously transmit the respective second pulses of second signals at a pulse duration of approximately 100 microseconds and at a pulse source level which has been preprogrammed in registers 39 of the sidescan sonar data acquisition element 23. Block 40 in the multibeam sonar data acquisition element 21 triggers the multibeam sonar device 5 to transmit the first pulses in response to the appropriate activation signals from the timer in block 26.

The time of arrival and the amplitude of the backscattered second signals received from the seafloor 3 by the transducers of the respective sidescan sonar devices 10 are read into registers 42 in the sidescan sonar data acquisition element 23 and stored while simultaneously position and orientation data from the gyroscope 15 and the differential global positioning system 16 is read into a register 43 for georeferencing the data corresponding to the backscattered second signals with the corresponding positions of the second portions of the seafloor 3. The data from the sidescan sonar devices 10 which is indicative of the profiles of the corresponding second portions of the seafloor and the data from the positioning systems 15 and 16, which is stored in the registers 42 and 43 is subsequently used in conjunction with the georeferenced data indicative of the profiles of the corresponding first portions of the seafloor 3 stored in the register 37 for producing the image of the topography of the seafloor 3. The preparation of this image can be carried out after surveying of the seafloor has been completed or during the survey, depending on the processing power of the computer.

A speed controller 49 which controls the speed of the vessel is responsive to the maximum time-of-flight of the first signals of the immediately previous first pulse computed by block 26 for altering the speed of the vessel. In other words, if the time-of-flight of the first signals is reducing, which would be indicative of the height of the vessel above the seafloor reducing, the speed controller 49 increases the speed of the vessel, and vice versa. However, in order to avoid any possible sudden alterations in speed of the vessel, the speed controller may be responsive to the average of the maximum time-of-flight of the first signals computed over a predetermined number of previous first pulses or a moving average, or alternatively the computed maximum time-of-flight of the first signals of the first pulses may be filtered to avoid spikes, which would otherwise result in a sudden change in speed of the vessel.

On completion of a survey, the georeferenced data indicative of the backscattered second signals which is indicative of the profiles of the corresponding second portions of the seafloor is read from the registers 42 and 43 of the sidescan sonar data acquisition element 23, and the goereferenced profile data is read from the register 37 and processed to prepare an image of the topography of the seafloor.

Computer simulations and practical tests which have been carried out have produced the following data and results. In 25 meters water column depths the transmission-reception cycle duration of a 120° fan angle of the first signals of the first pulses from the multibeam sonar device 5 is 66 milliseconds. This permits a maximum ping rate of first pulses of 15 pings per second, in other words, 15 first pulses per second. At a survey vessel speed of 6 knots to 12 knots an along-track sounding density of a swath or pulse every 0.2 meters to 0.4 meters is achievable, while in a water column at 50 meters the density of soundings translates to a swath or first pulse every 0.4 meters to 0.8 meters. This is typically greater than required, even more so in the case of Remotely Operated Vehicles (ROV) and Automatic Underwater Vehicles (AUV) operation where the vessel speed would typically be far slower, thereby allowing for a reduction in the ping rate of the multibeam and sidescan sonar devices 5 and 10, while still adhering to the resolution requirements of the International Hydrographic Office (IHO) requirements. The reduction in ping rates permitted affords transmission-reception cycle windows for the sidescan sonar device 10. By dynamically adjusting the trigger settings of payload sonars in real-time according to the varying imaging geometry configuration, multiple acoustic sensor datasets can be acquired simultaneously by interleaving their pings, thereby affording a significant increase in survey efficiency.

In the preferred embodiment, the multi-sonar device 5 operation is decomposed into the multibeam sonar data acquisition process, which is carried out by the element 21, the sidescan sonar data acquisition process which is carried out by the element 23, and the multi-sonar synchronisation process which is carried out by the element 24. The system framework is decomposed as such to ensure that the latency inherent in processing the multibeam data stream generated by the multibeam sonar device 5 does not stall the data acquisition processes. If the system executed sequentially, periodic gaps would occur in data coverage due to blocks 21 and 23 remaining idle while the synchronised multi-sonar timing schedule is being evaluated by block 24. Consequently, the processes carried out by blocks 21, 23 and 24 are executed in parallel, with the three shared-memory buffers 28, 30 and 36 acting as the inter-process communication network.

At the first ping, the multibeam sonar device 5 is initialised with the transmit parameters for the first pulses which are stored in the register 25, namely, the source level and duration of the first pulses. The multibeam sonar device 5 is triggered through an instruments communication interface (not shown) but which will be well known to those skilled in the art. The multibeam projector array of the multibeam sonar device 5 then emits a first pulse of the first signal which traces a beam of the wide fan angle $\beta$ in the first vertical transverse plane 7 and of the narrow fan angle $\theta$ in the first vertical longitudinal plane 8 as it propagates through the water column. Multiple reception beams are electronically synthesised from the acoustic energy of the backscattered first signals of the first pulse to generate a beamformed profile of the range of sample points along the ensonified seafloor swath. The multibeam data acquisition block 21 writes the beamformed swath profile in the buffer register 31 of block 30 of the processing and synchronisation element 24. Data indicative of the location of the vessel 2 is read from the gyroscope 15 and the differential global position sensing communications device 16 and written in the buffer register 32 in block 30 simultaneously as the data from the multibeam sonar sensor 5 is written in the buffer register 31 of block 30. Both sets of data are simultaneously time stamped. Both sets of data are read from the buffer registers 31 and 32 into the block 34 to generate and populate a georeferenced digital terrain model of the surveyed region. Since the registers 35 and 37 are empty on the occurrence of the first ping of the first pulses of the multibeam sonar device 5, the timing for the next immediately following second pulses from the sidescan sonar device 10 and the subsequent immediately following first pulse for the multibeam sonar device 5 are determined from the flight time of the first signals from the first pulse of the multibeam sonar device 5. As the survey progresses, the time duration between each second pulse and the immediately following next first pulse, and the time duration between each first pulse and the immediately following next second pulse is determined from the maximum time-of-flight of the immediately previous first pulse from the multibeam sonar device 5.

Depending on the depth of the water column beneath the vessel, and the resolution of the image to be subsequently prepared of the seafloor 3, the speed of the vessel is also determined from the maximum time-of-flight of the immediately previous first pulse from the multibeam sonar device 5, or from an average thereof a predetermined number of first pulses. Block 26 computes the time periods between the first and second pulses and the vessel speed from the data stored in the register 35 and times the relevant time periods and outputs appropriate signals to the blocks 28 and 36, which in turn activate the multibeam sonar device 5 and the sidescan sonar device 10 to ping the respective first and second pulses at the appropriate times. The block 26 also outputs signals to the speed controller 49 for controlling the speed of the vessel 2.

After completion of the first pass of the vessel 2 over the seafloor 3, the vessel 2 commences a second pass over the seafloor along a second path adjacent and parallel to the first path just traversed. As the vessel 2 proceeds along the second path, the block 26 also uses profile data of adjacent portions of the seafloor 3 stored in the register 37 as well as the maximum time-of-flight of the first signals of the immediately previous first pulse of the multibeam sonar device 5 for determining the time periods between the first and second pulses and the vessel speed.

Secondary rays can be traced in the specular direction to determine if multipath reflections from, for example, the sea surface might cause multipath interference. Given the parallel nature of ray tracing, the processing and synchronising element 24 processes the incoming data stream using a Single Instruction Multiple Data framework. The occurrences of when to trigger the multibeam sonar device 5 may be determined by temporally separating the trigger events by a time period equal to the summation of the predicted time periods of the multibeam transmission-reception cycle and the predicted sidescan sonar transmission-reception cycle. The time period required to complete the transmission-reception cycle proceeds as follows.

Figure 2:
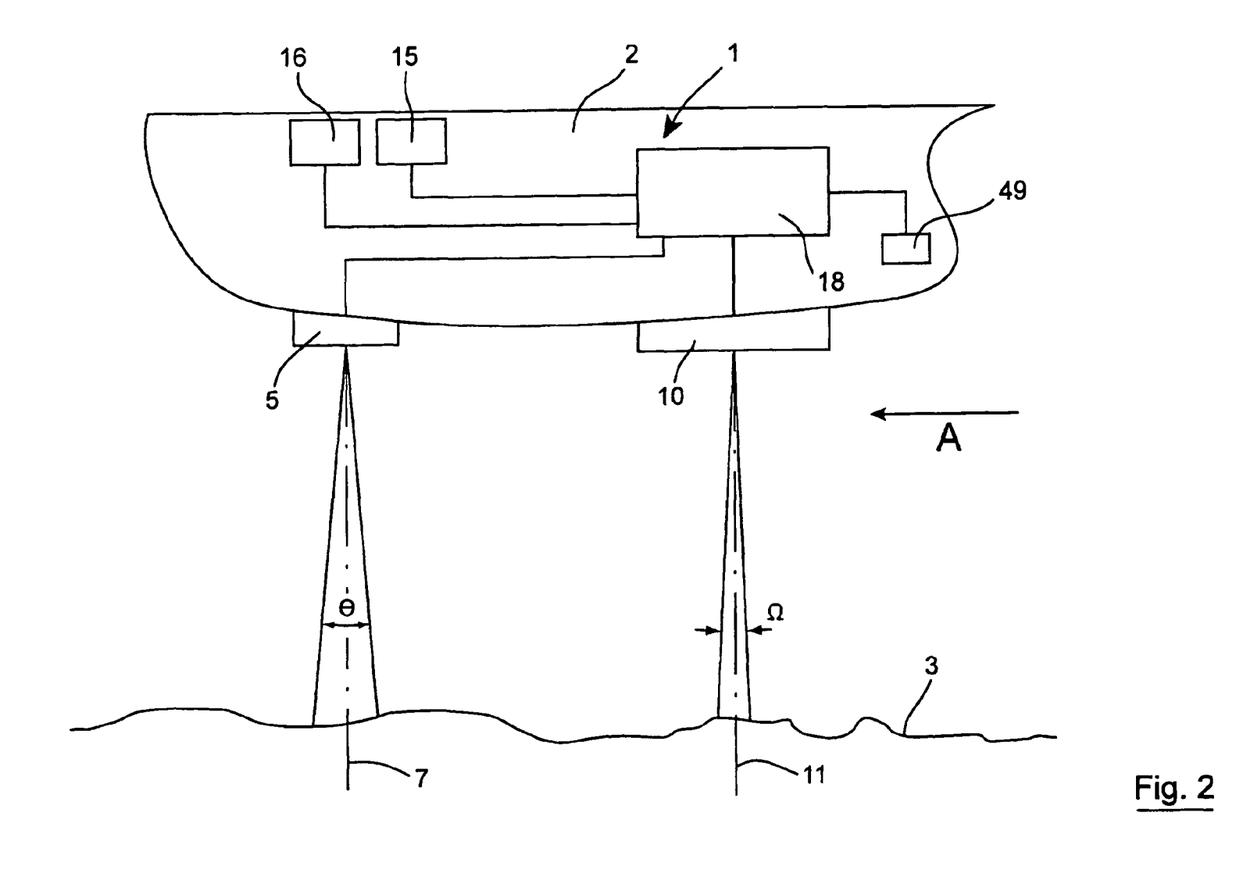
FIG. 2 is a side elevational view of a vessel incorporating the apparatus of FIG. 1.
Figure 3:
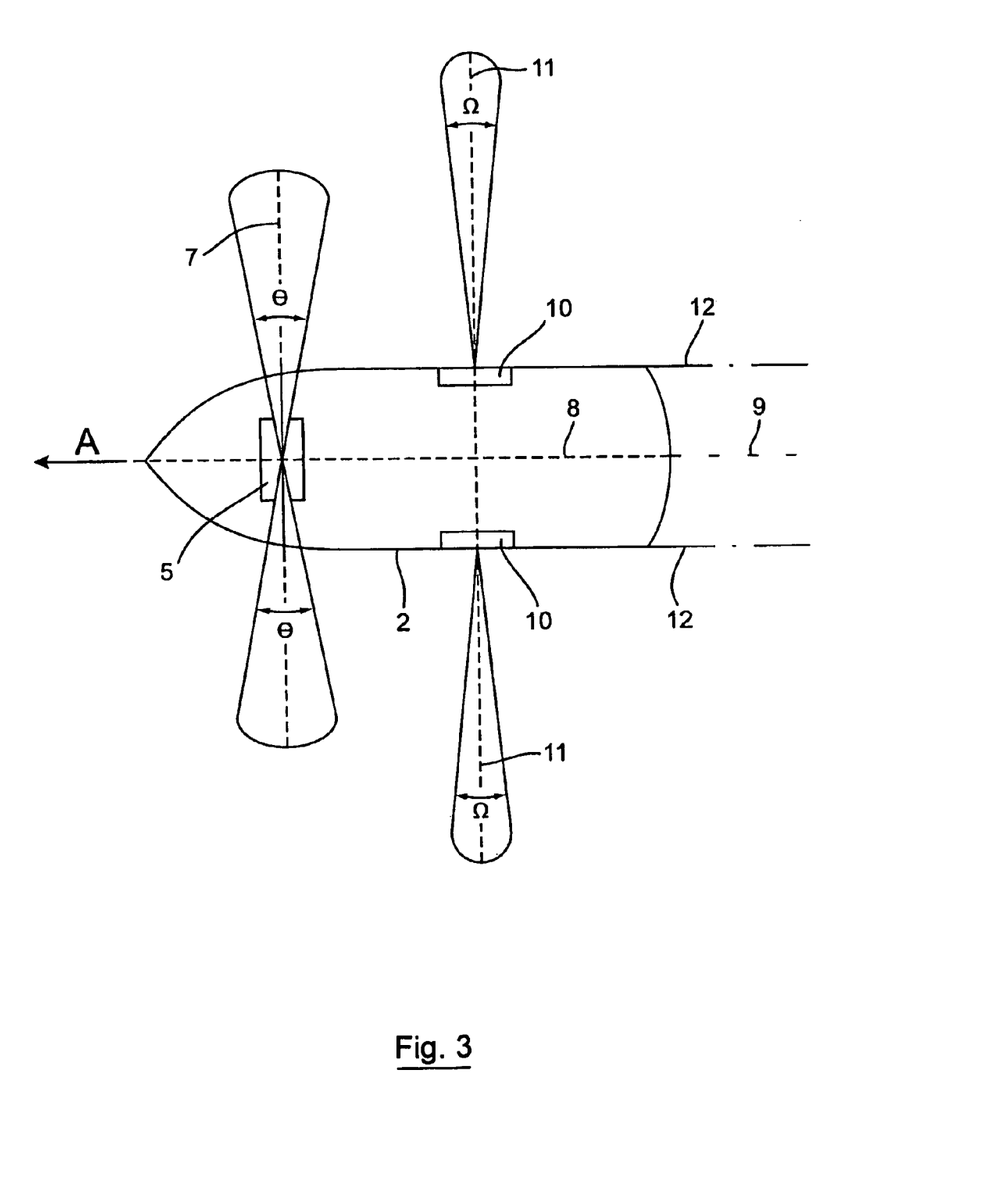
FIG. 3 is a top plan view of the vessel incorporating the apparatus of FIG. 1.

As the motion of the vessel 2 is in a forward direction, the mounting of the multibeam sonar device 5 fore of the sidescan sonar devices 10 compensates for the forward displacement of the vessel 2 between their respective transmission/reception cycles. This ensures that the first portion of the seafloor which is adjacent the second portions thereof imaged by the sidescan sonar devices 10 has already been imaged by the multibeam sonar device 5. Consequently, the geometry of the first portion of the seafloor already imaged by the multibeam sonar device 5 also serves as the a priori seafloor information needed to predict the time period of the sidescan sonar devices 10 transmission/reception cycle.

Figure 4:
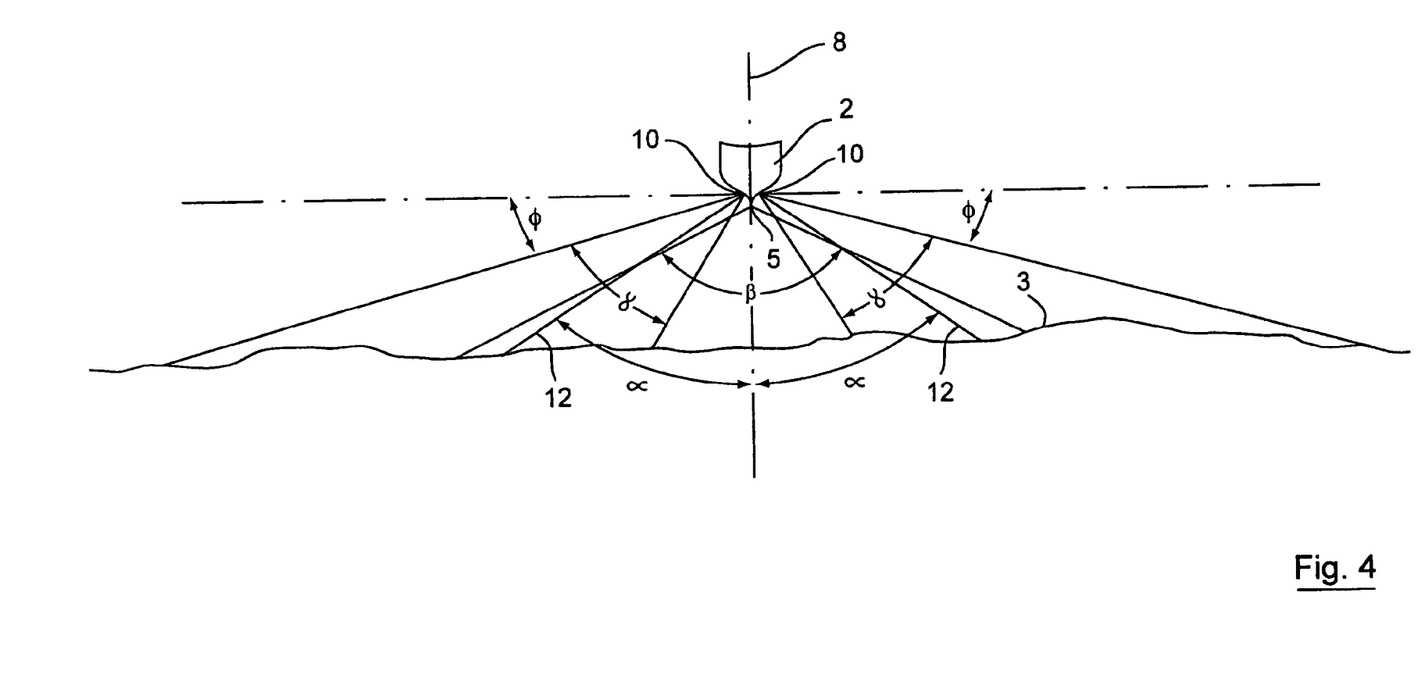
FIG. 4 is a front end view of the vessel of FIG. 2 incorporating the apparatus of FIG. 1.

The quality of multibeam imagery is best at angles near to the vertical due to the high specular reflection and the vertical projection of the reception beams on the seafloor encompassing a minimal footprint. However, as the angle of arrival increases from the vertical, the seafloor footprint of the electronically steered beams of the multibeam sonar device 5 increases leading to a progressive decrease in the resolution of the reconstructed image as across-track range increases. Conversely, images resulting from signals received from the sidescan sonar devices 10 at angles near the vertical is devoid of contrast due to the predominately specular reflection returning a band of high intensity energy, pulse length averaging effects, and the absence of meaningful highlight/shadow couplets of seafloor protruding features due to the high angle of incidence. The image only becomes beneficial for data interpretation purposes as the across-track range increases due to the increase in across-track resolution caused by pulse spreading and the oblique grazing angle providing both an elongation of occluded object shadow information and an increased contrast range due to the modulation of the sediment angular response with the surface relief. As a result, for optimal operation the angular sector encompassing each beam directivity pattern of the beam of the multibeam sonar device 5 and the beam of the sidescan sonar devices 10 is, while overlapping, significantly different. The focus of the multibeam sonar device 5 is primarily focused on an angular sector centred about the first vertical longitudinal plane 8, whereas the focus of the sidescan sonar devices 10 are primarily focused on an angular sector focused to image predominately at oblique incidence while ignoring regions close to the vertical.

While some multibeam sonar devices use a curved receive array, or alternatively a dual sonar arrangement, which has the effect of widening the fanbeam angle of the sonar device and bringing its limits closer to those of a typical sidescan sonar geometry, in a typical survey configuration the beam geometry of the payload imaging sonars is such that the multibeam ensonified swath has a shorter span to the across-track extremities than the sidescan ensonified swath. This renders a situation whereby the topographic structure of the seafloor at the oblique grazing incidence angles of the sidescan sonar devices 10 is not known. For example, at a survey altitude of 20 m off the seafloor, the sidescan ensonified swath would be almost double the span of the multibeam ensonified swath.

This non-overlapping swaths issue can be overcome by using the statistical properties of the imaged swath from the multibeam sonar device 5 to infer the geometry at the extremities of the sidescan swaths by extrapolation.

When imaging a nominally flat seafloor, the slant ranges to the unknown regions at the extremities of the swath of the sidescan sonar devices 10 can be inferred by extrapolating the imaged seafloor swath of the multibeam sonar device 5 at the average depth of the measured sample points. For sloped regions of the seafloor where the survey transect-lines are not orthogonal to the contour lines of the measured multibeam bathymetry, the seafloor can be extrapolated at the measured gradient. While for complex undulating seafloor terrains the flat plane assumption is no longer valid, it is possible to exploit the fact that the roughness of the ensonified swath in generally homogeneous. This permits the amplitude variations of the swath about its nominal gradient to be extrapolated using statistical measures of the surface roughness, for example using fractal synthesis techniques.

The sidescan sonar data acquisition element 23 is initialised with the transmit parameters and triggered via an instrument communications interface (not shown, but which will be well known to those skilled in the art). The sidescan sonar devices 10 emit the second pulses, the spatio-temporal evolution of which traces the fanbeam pattern with the wide fan angle $\gamma$ in the second vertical transverse plane 11, and the narrow fan angle $\Omega$ in the second inclined longitudinal planes 12. The sidescan sonar devices 10 are configured to sample the acoustic energy of the backscattered second signals received by the transducers (not shown) of the side scan sonar devices 10 for a reception time period equal to the predicted two-way time-of-flight. The backscattered time versus amplitude trace is georeferenced by the incoming navigation and vessel position data from the gyroscope 15 and the differential global position sensor 16, and the georeferenced backscattered time v. amplitude trace is stored in the register 43 in the side scan sonar data acquisition element 23.

The multibeam sonar device 5 is scheduled to ping the next first pulse of first signals immediately after the transmission/reception cycle of the sidescan sonar devices 10 has terminated. By interleaving the pings of the multiscan sonar device 5 and the sidescan sonar devices 10 in such a fashion, the time separation between successive pings of first and second pulses is sufficient to prevent cross-sensor acoustic interference.

Depending on the computational resources available to carry out the processing which is carried out by the element 24 processing a continuous train of successive pings of first pulses may create an excessive computational bottleneck. This is avoided by exploiting the fact that as the seafloor topography in general will not change significantly over successive pings, the processing and synchronising block 24 can operate with a lower frequency update rate than the sonar ping rate of first pulses due to the high degree of redundancy exhibited by successively imaged swathes. The timing schedule of the payload of the multibeam and sidescan sonar devices 5 and 10 is determined by processing alternate pings, with the separation between processed pings determined by the capability of the available computational resources to execute without backlog.

The survey operation proceeds as described until the end of the current transect line. By conventional pre-survey planning, transect lines are typically laid out systematically in straight lines such that adjacent transects are parallel, commonly known as a lawnmower style survey pattern. This ensures uniformity in both the spatial coverage and aspect dependence of acquired imagery and also helps reduce helmsman fatigue by reducing the amount of effort required to restrain survey vessel deviations from the transects. To guarantee desired soundings per square area of seafloor, transect planning relies on significant swath overlap to allow for seafloor terrain and depth variation. While this approach promotes a certain amount of data redundancy, thereby prolonging the survey duration, it ensures that gaps in the sonar coverage are kept to a minimum, especially at the swath extremities where object occlusion, poor signal to noise ratios, and multipath interference can significantly reduce the sonar's operating range.

The method and apparatus described exploits the swath overlap inherent in conventional survey planning techniques by using the bathymetry determined from the first pulses produced by the multibeam sonar device 5 from the previous survey transect line to extract the a priori seafloor geometry information required to predict the duration of sidescan sonar transmission/reception cycles on the current transect line. Recent advances in computational technology enable real-time processing of multibeam data to generate and update a Digital Terrain Model of the surveyed area online. However, to increase the computational efficiency the method according to the invention partitions the Digital Terrain Model into spatially disjoint regions as it is created. The most intuitive method to achieve this is to segment the mesh into parallel strips corresponding to each transect line.

A further advancement is to partition the survey data from each transect line into two separate regions by bisecting the coverage along the seafloor touch down point of the centre beam. The rationale is that the coverage from the next transect-line will only overlap the coverage of the current transect-line corresponding to the perimeter of the survey area and therefore the inner segment can be discarded from the relevant memory buffer. Depending on the computational resources available to the survey controller, the outer segment can be further partitioned in the along-track direction into multiple smaller meshes.

For example, given a survey vessel with a forward speed of 3 knots and an altitude of 20 meters above the seafloor, the maximum ping repetition rate of first pulses of the multibeam sonar device 5 when imaging a nominally flat seafloor would be a 6 pings/sec with both multibeam and sidescan sonar devices 5 and 10 accounting for the sidescan sonar ping interleaving process. At 256 depth samples per ping of first pulses of the multibeam sonar device 5, the number of mesh vertices collected along a 1 kilometer transect would be approximately 4000 pings×256 depth samples=1 million vertices. By bisecting this mesh along the along-track path followed by the first pulses of the multibeam sonar device 5, and further partitioning the outer mesh segment at 40 m intervals, the resulting segmentation would yield 25 nominally square meshes constructed by 20,000 vertices each.

It will be appreciated that while the method and apparatus have been described with particular reference to a system and methodology associated with the synchronised operation of similar frequency multibeam and sidescan sonar devices, those skilled in the art will recognise that variants and modifications can readily be made to enable the principles of the invention to be applied to synchronise the operation of more than one multibeam sonar device and more than two sidescan sonar devices spaced apart longitudinally along the vessel, and furthermore, it will be appreciated that other types of sonar devices may be used besides those described.

While the multibeam sonar device and the sidescan sonar devices have been described as being alternately operated for alternately transmitting the first and second pulses, respectively, it is envisaged in certain cases, that the multibeam sonar device and the sidescan sonar devices may not be alternately operated, but rather, the multibeam sonar device may be operated to transmit a number of first pulses consecutively without second pulses being transmitted by the sidescan sonar devices, for example, for every two or three consecutively transmitted first pulses by the multibeam sonar device, the sidescan sonar devices may be operated to transmit only one second pulse.

While the time durations between first and second pulses, and between second and first pulses have been described as being determined based on the maximum time-of-flight of the first signals of the immediately previous first pulse, the time duration between the first and second pulses, and the second and first pulses could be determined based on the maximum time-of-flight of the first signals of any previous first pulse, or on the average of the maximum time-of-flight of a series of previous first pulses, and it is also envisaged that the time-of-flight of the first signals may be used rather than the maximum time-of-flight thereof.

While the vessel has been described as traversing the seafloor in effectively parallel paths, in certain cases; it is envisaged that paths of other configuration may be followed by the vessel in traversing the seafloor.

Additionally, while the apparatus according to the invention has been described as being mounted on a surface vessel, it will be readily apparent to those skilled in the art that the apparatus according to the invention may be mounted on an underwater vessel, and where mounted on an underwater vessel, other suitable means of determining the location of the vessel relative to the seafloor for georeferencing the data indicative of the surface of the portions of the seafloor besides a differential global positioning system will be used.

It is also envisaged that Digital Terrain Model is represented as a multi-resolution abstraction, which is constructed outside of the survey controller processing loop, and is queried at runtime to determine the geometry of the region of the seabed to be ensonified by the sidescan which is beyond the range of the current multibeam ensonified swathe.

It is also envisaged that instead of using sonar devices, other devices may be provided for producing the first and second pulses of the first and second signals such as Light Detecting And Ranging (LIDAR), radar, medical ultrasonic, and electromagnetic interrogation techniques.

It is also envisaged that by analysing the degree of overlap between the data being acquired on the current transect and a Digital Terrain Model populated with the data acquired on previous transects, the optimal heading of the survey platform can be determined. (A 5-10 m overlap between the outer reaches of the current swathe and the previous swathe is generally sufficient.)

While the time durations between the first and second and the second and first pulses has been described as being determined as a function of the maximum time-of-flight of the first signals of the immediately previous first pulse, it is envisaged that the time durations between the first and second and the second and first pulses may be determined as a function of the average of the maximum time-of-flight, or the average time-of-flight of the first signals of a predetermined number of previous first pulses, for example, the previous two to five first pulses, in order to smooth out sudden spikes in the signals received from the multibeam sonar device and the sidescan sonar devices. However, it is also envisaged that spikes could be smoothed by filtering the signals from the multibeam and sidescan sonar devices.

In cases where the method and apparatus are used in conjunction with a submerged remotely operated vessel, since such remotely operated vessels typically send all data to a surface vessel for processing, via an umbilical tether containing either copper or fibre optic telemetry lines, with the resulting control commands sent back to the remotely operated vessel though the same umbilical, since such umbilical lines may be of length between 1000 m and 2000 m, transmitting data across such umbilical lines encounters a non-deterministic latency (encountered mainly at the termination media converters). This can have significant effects on the performance of the apparatus, as any trigger on demand commands will encounter a delay due to transmission line latency. To circumvent this it is preferred that while processing and calculation of the timing schedule for the multibeam sonar device is performed by the computer on the surface vessel, the actual triggering hardware could be deployed on the remotely operated vessel. Once the computer on the surface vessel and the hardware on the remotely operated vessel are time synchronised by, for example, using GPS on the surface vessel with a GPS synchronisable oscillator on the remotely operated vessel, the timing schedules could be calculated on the surface vessel and sent to the triggering hardware on the remotely operated vessel, which would then be configured to trigger each of the multi beam and sidescan devices at the corresponding time event. As the transmission line between the triggering hardware and each of the individual multiscan and sidescan sonar devices would be direct, the issue of umbilical latency would be eliminated. This, however, is not an issue with either ship or Autonomous Underwater Vehicle deployed survey systems as the processing hardware is mounted onboard.

The invention claimed is:

1. A method for determining the topography of a seafloor, the method comprising:
    sequentially transmitting a plurality of respective first pulses of first signals of a predetermined first frequency towards respective first portions of the seafloor,
    sequentially receiving backscattered first signals resulting from backscattering of the first signals of the respective first pulses from the seafloor, sequentially transmitting a plurality of respective second pulses of second signals of a predetermined second frequency towards respective second portions of the seafloor,
    sequentially receiving backscattered second signals resulting from backscattering of the respective second signals of the second pulses from the seafloor, and
    storing data representative of the received backscattered first and second signals referenced to data representative of the locations of the corresponding first and second portions of the seafloor for facilitating preparation of an image of the topography of the seafloor, wherein
    each second pulse is transmitted between two consecutive first pulses,
    the time duration between each second pulse and the next following first pulse is determined as a function of the maximum time-of-flight of the first signals of a previous first pulse from the time of transmission thereof to the time of reception of the corresponding backscattered first signals, and
    the time duration between each first pulse and the next following one of the first and second pulses is determined as a function of the maximum time-of-flight of the first signals of one of the previous first pulses from the time of transmission thereof to the time of reception of the backscattered first signals.

2. A method as claimed in claim 1 in which the time duration between each second pulse and the next following first pulse is determined as a function of the maximum time-of-flight of the first signals of the immediately previous first pulse from the time of transmission thereof to the time of reception of the corresponding backscattered first signals.

3. A method as claimed in claim 1 in which one of the second portions of the seabed at which the corresponding one of the second pulses of the second signals is directed lies adjacent one of the first portions of the seabed at which a previous one of the first pulses of first signals is directed.

4. A method as claimed in claim 3 in which the first pulses of the first signals are transmitted through a wide fan angle in a first substantially vertical transverse plane extending transversely of the direction of motion of the vessel, the fan angle of the first pulses of the first signals in the first transverse plane is of angular size in a range up to an angle of 180°.

5. A method as claimed in claim 3 in which the second pulses of the second signals are transmitted through a wide fan angle in a second substantially vertical transverse plane extending transversely of the direction of motion of the vessel, the fan angle of the second pulses of the second signals in the second transverse plane is of angular size in a range up to an angle of 90°.

6. A method as claimed in claim 3 in which the speed of the vessel is a function of the time-of-flight of the first signals of the first pulse of a previous one of the first pulses from the time of transmission thereof to the time of reception of the backscattered first signals.

7. A method as claimed in claim 1 in which the first and second signals of the first and second pulses are sonic signals of frequency lying in the range of 1 kHz to 1 MHz.

8. A method as claimed in claim 1 in which the first and second pulses of the first and second signals are alternately transmitted.

9. Apparatus for determining the topography of a seafloor, the apparatus comprising:
   a first transmitter sequentially transmitting a plurality of respective first pulses of first signals of a predetermined first frequency towards respective first portions of the seafloor,
   a first receiver sequentially receiving backscattered first signals resulting from backscattering of the first signals of the respective first pulses from the seafloor,
   a second transmitter sequentially transmitting a plurality of respective second pulses of second signals of a predetermined second frequency towards the respective second portions of the seafloor,
   a second receiver sequentially receiving backscattered second signals resulting from backscattering of the respective second signals of the second pulses from the seafloor, and
   a data storing register storing data representative of the received backscattered first and second signals referenced to data representative of the locations of the corresponding first and second portions of the seafloor for facilitating preparation of an image of the topography of the seafloor, wherein
   the first transmitter and the second transmitter are operated so that each second pulse is transmitted between two consecutive first pulses,
   the first and second transmitters are operated so that the time duration between each second pulse and the next following first pulse is determined as a function of the maximum time-of-flight of the first signals of a previous first pulse from the time of transmission thereof to the time of reception of the backscattered first signals by the first receiver, and
   the time duration between each first pulse and the next following one of the first and second pulses is determined as a function of the maximum time-of-flight of the first signals of one of the previous first pulses from the time of transmission thereof to the time of reception of the backscattered first signals by the first receiver.

10. A vessel comprising apparatus for determining the topography of a seafloor, the apparatus comprising:
   a first transmitter located on the vessel and sequentially transmitting a plurality of respective first pulses of first signals of a predetermined first frequency towards respective first portions of the seafloor,
   a first receiver located on the vessel and sequentially receiving backscattered first signals resulting from backscattering of the first signals of the respective first pulses from the seafloor,
   a second transmitter located on the vessel and sequentially transmitting a plurality of respective second pulses of second signals of a predetermined second frequency towards the respective second portions of the seafloor,
   a second receiver located on the vessel and sequentially receiving backscattered second signals resulting from backscattering of the respective second signals of the second pulses from the seafloor, and
   a data storing register located on the vessel and storing data representative of the received backscattered first and second signals referenced to data representative of the locations of the corresponding first and second portions of the seafloor for facilitating preparation of an image of the topography of the seafloor, wherein
   the first transmitter and the second transmitter are operated so that each second pulse is transmitted between two consecutive first pulses,
   the first and second transmitters are operated so that the time duration between each second pulse and the next following first pulse is determined as a function of the maximum time-of-flight of the first signals of a previous first pulse from the time of transmission thereof to the time of reception of the backscattered first signals by the first receiver, and
   the time duration between each first pulse and the next following one of the first and second pulses is determined as a function of the maximum time-of-flight of the first signals of one of the previous first pulses from the time of transmission thereof to the time of reception of the backscattered first signals by the first receiver.

11. A method as claimed in claim 1 in which the time duration between each first pulse and the next following one of the first and second pulses is determined as a function of the time-of-flight of the first signals of the immediately previous first pulse from the time of transmission thereof to the time of reception of the backscattered first signals.

12. A method as claimed in claim 1 in which the time duration between each second pulse and the next following first pulse is determined as a function of the resolution with which the image of the topography of the seafloor is to be prepared.

13. A method as claimed in claim 1 in which the time duration between each first pulse and the next following one of the first and second pulses is determined as a function of the resolution with which the image of the topography of the seafloor is to be prepared.

14. A method as claimed in claim 3 in which the one of the second portions of the seabed at which the corresponding one of the second pulses of the second signals is directed is adjacent the one of the first portions of the seabed at which the immediately previous one of the first pulses of first signals is directed.

15. A method as claimed in claim 1 in which the first and second pulses of the first and second signals are transmitted from a moving vessel, the first pulses of the first signals being transmitted from a first location on the vessel forward of a second location relative to the direction of movement of the vessel from which the second pulses of the second signals are being transmitted.

16. A method as claimed in claim 15 in which the first pulses of the first signals are directed downwardly to the respective first portions of the seafloor, the first portions of the seafloor being located beneath the vessel.

17. A method as claimed in claim 15 in which the second pulses of the second signals are transmitted from the vessel in a generally sidewardly outwardly and downwardly direction towards the respective second portions of the seafloor, the second portions of the seafloor being beneath and to one side of the vessel.

18. A method as claimed in claim 15 in which the second pulses of the second signals are transmitted from respective opposite sides of the vessel in a generally sidewardly outwardly and downwardly direction towards respective ones of the second portions of the seafloor on respective opposite sides of the vessel.

19. A method as claimed in claim 1 in which the first signals of the first pulses are of frequency lying in the range of 100 kHz to 900 kHz.

20. A method as claimed in claim 1 in which the frequency of the first and second pulses is substantially similar.

* * * * *